United States Patent [19]

Brashear

[11] 4,161,343
[45] Jul. 17, 1979

[54] CONE RETAINER FOR A ROTARY ROCK BIT

[75] Inventor: Homer J. Brashear, De Soto, Tex.

[73] Assignee: Dresser Industries, Inc., Dallas, Tex.

[21] Appl. No.: 926,768

[22] Filed: Jul. 21, 1978

[51] Int. Cl.² ............................................. F16C 19/00
[52] U.S. Cl. ................................... 308/8.2; 76/108 A; 308/DIG. 11
[58] Field of Search .................... 308/8.2, DIG. 11; 76/108 A

[56] References Cited

U.S. PATENT DOCUMENTS

| | | | |
|---|---|---|---|
| 1,865,706 | 7/1932 | Reed | 308/8.2 X |
| 2,065,740 | 12/1936 | Reed | 308/DIG. 11 X |
| 2,814,465 | 11/1957 | Green | 308/8.2 |
| 3,361,494 | 1/1968 | Galle | 308/8.2 |
| 3,746,405 | 7/1973 | Welton | 308/8.2 |

Primary Examiner—Douglas C. Butler
Attorney, Agent, or Firm—Eddie E. Scott

[57] ABSTRACT

The rolling cone cutters of a rotary rock bit are held in place on the bit's bearing pins without the use of the conventional ball bearing locking systems. The improved cone retainer includes a groove in the rolling cone cutters that cooperate with plugs or rods extending from the bearing pin. The plugs (rods) are positioned to bridge between the groove in the rolling cone cutters and bearing pins to retain the rolling cone cutters on the bearing pins. Expander rods are inserted through passages in the bearing pins to extend the plugs (rods) into the grooves in the rolling cone cutters and maintain the cutters in the proper position during the drilling operation.

3 Claims, 3 Drawing Figures

U.S. Patent  Jul. 17, 1979  4,161,343
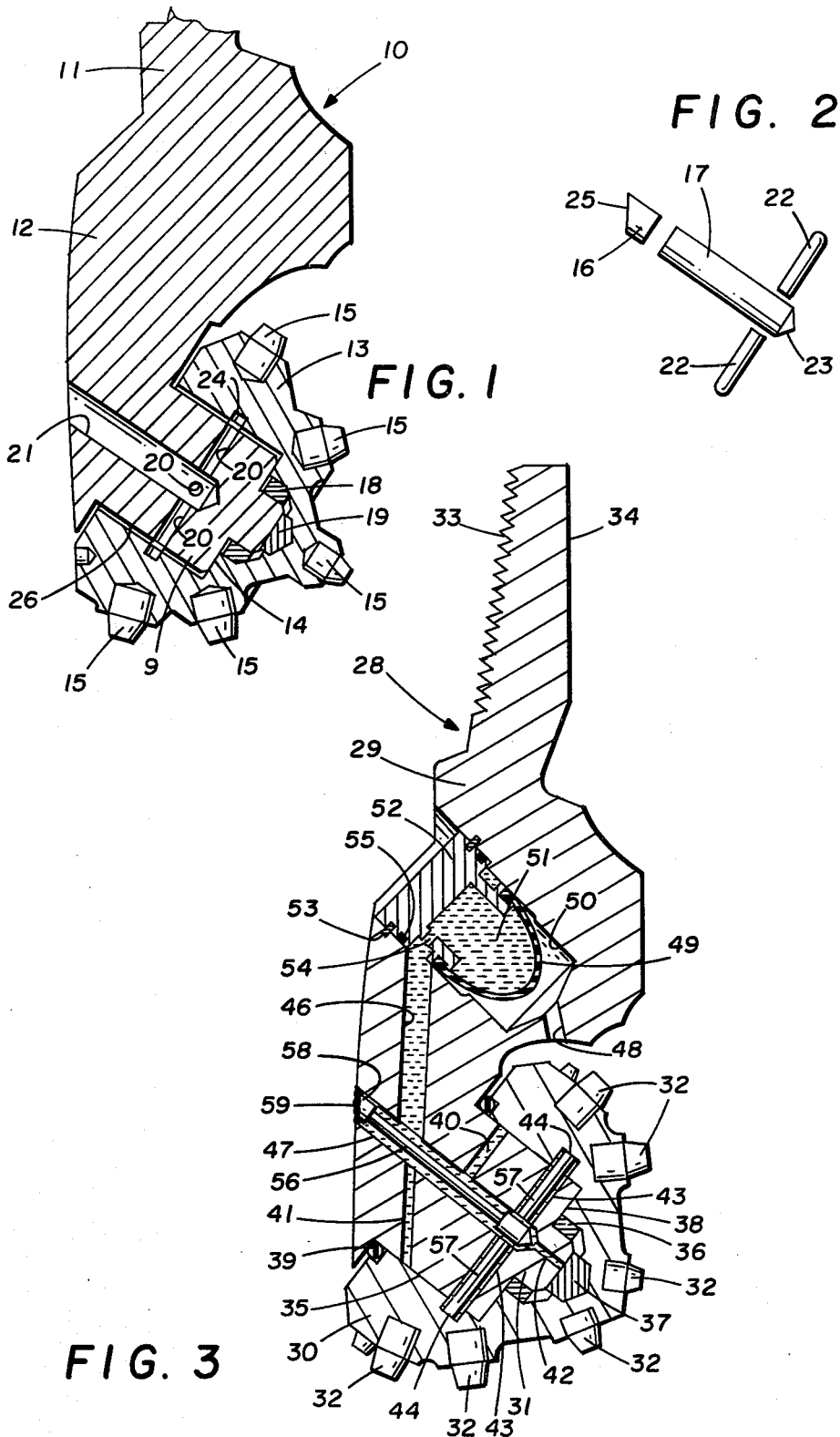

CONE RETAINER FOR A ROTARY ROCK BIT

TECHNICAL FIELD

The present invention relates to the art of earth boring and, more particularly, to a rolling cone cutter rock bit with improved means for retaining the cone cutter on the bearing pin.

BACKGROUND OF THE INVENTION

A rotary cone rock bit is adapted to be connected as the lowest member of a rotary drill string. As the drill string is rotated, the bit disintegrates the earth formations to form an earth borehole. The bit includes individual arms that extend angularly downward from the main body of the bit. The lower end of each arm is shaped to form a spindle or bearing pin. A cone cutter is mounted upon each bearing pin and adapted to rotate thereon. Individual bearing systems promote rotation of the cone cutters. The bearing systems have traditionally been roller bearings, ball bearings, friction bearings and/or a combination of the aforementioned bearings. The cone cutters include cutting structures on their outer surfaces that serve to disintegrate the formations as the bit is rotated.

The rotary rock bit must operate under very severe conditions, and the size and geometry of the bit is restricted by the operating characteristics. Some means for locking the cone cutter on the bearing pin must be provided. Traditionally, the locking function has been performed by a ball bearing system although other systems are known. The ball bearing system is used almost exclusively to retain the cone on the bearing journal and generally does not carry radial loads. Thus, a substantial portion of the available bearing space is wasted as far as radial capacity is concerned. This is especially critical in a small bit where bearing space is already minimal. The present invention allows a larger percentage of bearing space to be utilized for carrying radial loads thus increasing the bearing capacity of the bit.

DESCRIPTION OF PRIOR ART

In U.S. Pat. No. 3,361,494 to E. M. Galle, patented Jan. 2, 1968, a journal bearing bit is shown. The rolling cutter is secured on the bearing pin without the use of a ball bearing system. A bearing pin or shaft is provided in the form of a complete figure of revolution and including a laterally projecting portion or lip of greater diameter than the portion of the shaft axial therebehind, and a cutter with an internal contour exactly matching the shaft surface except for the small increments in diameter for operating clearance, lubricant volume, manufacturing tolerances and the like. This bearing pin is then relieved, to the extent necessary for mounting the cutter, by machining downwardly from that portion of its surface opposite the pressure side of the shaft, i.e., the "non-pressure" side. The pressure side of the shaft is that part nearest the bottom and side wall of the formation borehole, as indicated by the vertical plane through the axis of the bearing pin, and the non-pressure side is its diametrically opposed counterpart. The pressure side of any shaft is the portion designed or adapted for maximum load transmission. The rolling cutter is then assembled to the bearing pin by combination of linear, sliding and cocking movements, or in some cases a succession of linear or sliding movement. A portion of the cutter is thus positioned behind the aforementioned lip or flange of the bearing pin, and it is this lip which prevents the cutter from being withdrawn by axial movement only. Withdrawal can be accomplished only by reversing the assembly procedure including any cocking movement. Such disassembly is prevented by inserting a plug into a bore extending from the outside of the bit leg completely through the bearing pin, or at least by a plug member secured in a bore or the recess in the bearing pin and having an end projecting outwardly into a space between the bearing pin and the cutter. This plug projects from the bearing pin into a gap or recess in a part of the inside surface of the cutter which would have to be cocked or otherwise moved in disassembly in such a manner as to make such cocking or other movement impossible, thereby locking the two members together. The plug is secured in this position by any conventional means, e.g., welding it to the bit head at the entrance of the bore.

In U.S. Pat. No. 3,746,405 to Russell L. Welton, patented July 17, 1973, a well drilling bit is shown. A journal bearing of right cylinder form is provided, characterized by the formation of a strategically placed recess, or recesses therein and all without subtracting from the load carrying capabilities of the bit. The assembly is retained in working condition by a single element combined with the lubrication means and assuring proper axial placement of the roller cutter.

In U.S. Pat. No. 1,909,078 to F. L. Scott, patented May 16, 1933, an internally threaded journal bushing is secured inside the cutter by a locking ring and mounted on the bearing pin by an engagement of the bushing threads to corresponding threads on the surface of the bearing pin. While such arrangements worked satisfactorily, they involved at least two parts (bushing and locking ring) in addition to the bearing pin and cutter, plus considerable machining to form the threads, groove for locking ring, etc. In addition, the bushing interposed between bearing pin and cutter and not integral with either, subtracted from the bearing pin diameter, cutter shell thickness, or both. Although threadedly secured to the bearing pin, thus not rotating with the cone, it could not be considered a part of the bearing pin and was an independent source of trouble as well as reducing the strength of the bearing pin.

In U.S. Pats. Nos. 1,852,478; 1,867,531; 1,921,700 and 1,921,701 to E. A. Reed, earth boring bits are shown including a bearing pin, a bushing in at least one part, a cutter, and a locking pin. A lug and recess structure located on the bearing pin and bushing at right angles to the locking pin prevented the bushing from rotating. The main surfaces of the bearing pin, the bushing and the cutter were completely conical surfaces having an included angle of 90°, this feature plugs the locking pin and lug and recess features purportedly making it possible to assemble the parts without the use of threads but being unworkable for any included angle less than 90°.

In U.S. Pat. No. 1,854,624 to A. F. Powell, patented Apr. 19, 1932, a well drilling bit is shown. A bearing pin is utilized in the form of a complete right cylinder. A bushing is threaded onto the bearing pin. The cutter is secured to the bushing by an annular locking ring extending radially between the two members about midway between the ends of the bushing.

In U.S. Pat. No. 2,620,686 to R. G. Peter, patented Dec. 9, 1952, a method of mounting a cutter upon an earth boring bit is shown. A lip was formed by heating the bearing pin and while it was hot and plastic forcing the cutter on it by an axial compressive movement, thus upsetting the plastic metal into the groove of the cutter.

In U.S. Pats. Nos. 2,076,002 and 2,058,624 to C. E. Reed, earth boring drills are shown. The cutter is retained by a spindle extending from the bit body.

SUMMARY OF THE INVENTION

The present invention provides a cone cutter retaining means that requires less room than the traditional ball bearing system, that is reasonable in cost and that provides equal or greater load capacity. The cutter retaining means locks the rolling cone cutter on the bearing member during the drilling operation. The cutter retaining means includes a groove in the rolling cone cutter and plugs or rods that extend from the bearing pin. The plugs or rods bridge between the groove in the rolling cone cutter and the bearing pin to retain the cutter on the bearing pin. Means are provided to maintain the plugs or rods in the locking position. The foregoing and other features and advantages of the present invention will become apparent from a consideration of the following detailed description of the invention when taken in conjunction with the accompanying drawings.

BRIEF DESCRIPTION OF THE DRAWINGS

FIG. 1 is an illustration of a rotary rock bit constructed in accordance with the present invention.

FIG. 2 is an illustrative view of the cutter retaining elements of the bit shown in FIG. 1.

FIG. 3 is an illustration of another embodiment of a rotary rock bit constructed in accordance with the present invention.

DETAILED DESCRIPTION OF THE INVENTION

The rolling cutter of a rotary rock bit is held in place on the bearing pin of the bit without the use of the traditional ball bearings. The bit includes a body with a bearing pin extending from the body. A rolling cone cutter is adapted to be rotatably mounted on the bearing pin. A cutter retaining means locks the cutter on the bearing pin. The cutter retaining means includes a groove in the rolling cone cutter and hardened steel plugs (rods) projecting through the bearing pin. The hardened steel plugs (rods) are positioned to bridge between the groove in the rolling cone cutter and the bearing pin to retain the rolling cutter on the bearing pin. An expander rod is positioned in a passage in the bearing pin to maintain the retaining plugs (rods) in the locking position.

Referring now to FIG. 1, a sectional view of one arm 12 of one embodiment of a rotary rock bit 10 incorporating the present invention is shown. It is to be understood that the structures of the other arms are substantially identical to the arm 12. The body 11 of bit 10 includes a threaded portion that allows the bit 10 to be connected to the lower end of a rotary drill string (not shown). The bit 10 also includes a central passageway extending along the central axis of the bit to allow drilling fluid to enter from the upper section of the drill string (not shown) immediately above and pass downward to the bottom of the well bore to flush cuttings and drilling debris from the well bore.

A cutter 13 is rotatably positioned on the journal portion or bearing pin 9 extending from the arm 12. The cutter 13 is adapted to disintegrate the earth formations as the bit 10 is rotated. The cutting structure 15 on the surface of cutter 13 contacts and disintegrates the formations in a manner that is well known in the art. The cutting structure 15 is shown in the form of tungsten carbide inserts. However, it is to be understood that other cutting structures such as steel teeth may be used as the cutting structure on the cone cutter 13. The cutter 13 is locked on the bearing pin by hardened steel plugs or rods that extend into a groove in the cutter 13 in a manner that will be explained in greater detail subsequently.

The journal portion of the bit 10 consists of the bearing pin 9 upon which the cutter 13 is mounted. A plurality of bearing systems are located in the bearing area between the cutter 13 and the bearing pin 9. The bearing systems in the bearing area include an outer friction bearing 26, an inner friction bearing 18, thrust button 19, and a thrust flange 14. The bearing systems promote rotation of the cutter 13 as the bit 10 is rotated by the drill string and moved through the formations. An annular groove 24 is provided in the cutter 13. An expander passageway 21 extends from the arm 12 to a position radially aligned with the groove 24 in the cutter 13. The expander passageway 21 allows an expander rod to be inserted to move the individual plugs or rods into the locking position. After the plugs or rods are in place, the expander passageway 21 is closed by a closure plug which is held in position by a weld. A multiplicity of plug (rod) passageways 20 extend radially from the expander passageway 21. The passageways 20 are aligned with the groove 24.

Referring now to FIG. 2, the retaining elements for locking the cone cutter 13 on the bearing pin 9 are illustrated. A multiplicity of plugs or rods 22 fit within the passageways 20. An expander rod 17 moves the plugs (rods) 22 into the locking position. The end 23 of the expander rod 17 is beveled or pointed to assist in moving the plugs (rods) 22 into position. Once the expander rod 17 is in place, a closure plug 16 is inserted in the passageway 21 and welded therein to maintain the elements in place. The end 25 of the closure plug 16 is shaped to conform with the surface of the arm 12.

The structural elements of one embodiment of a rotary rock bit constructed in accordance with the present invention having been illustrated, the method of constructing a rock bit according to the present invention will now be considered with reference to FIGS. 1 and 2. Some means must be provided for locking the rolling cone cutter 13 on the bearing pin 9. Traditionally, the locking function has been performed by a ball bearing system. The present invention locks the cone cutter 13 on the bearing pin 9 without the use of the conventional ball bearing system. The hardened steel plugs 22 are moved into the retainer groove 24 of the cone cutter 13 and held there by the steel expander rod 17. The closure plug 16 is placed in passage 21 and welded therein. This can be accomplished without fear of heat affecting the hardened journal because of the weld's location away from the bearing pin 9. As many retainer plugs as necessary can be used and they can be made of other metals than steel. The cone shell thickness over the retainer groove 24 can be increased because there is no longer a need for the half ball depth required with the ball bearing locking systems.

The individual plugs or rods 22 are assembled in a collapsed position in the bearing pin passageways 20. The cone cutter 13 is mounted over the bearing pin 9. The bearing area may be prelubricated to assist in assembly. It is also to be understood that the bearing could be sealed and a lubrication system provided in a manner well known in the art. The expander rod 17 is inserted through the passageway 21. The expander rod contacts the plugs (rods) 22 and forces them into position to hold the cutter 13 on the bearing pin 9 and carry any axial thrust of the cutter 13. The ends of the plugs 22 extend into the groove 24 in the cone cutter 13 to retain the cutter on the bearing pin 9. The passageway 21 is closed by the plug 16 which is welded in place by a weld.

Referring now to FIG. 3, a sectional view of one arm 29 of another embodiment of a rotary rock bit 28 illustrating the present invention is shown. It is to be understood that the structures of the other arms are substantially identical to the arm 29. A cutter 30 is rotatably positioned on a journal portion 31 of the arm 29 and adapted to disintegrate the earth formations as the bit 28 is rotated. The cutting structure 32 on the surface of cutter 30 contacts and disintegrates the formations in a manner that is well known in the art. The cutting structure 32 is shown in the form of tungsten carbide inserts. However, it is to be understood that other cutting structures such as steel teeth may be used as the cutting structure on the cone cutter 30.

The body of bit 28 includes an upper threaded portion 33 that allows the bit 28 to be connected to the lower end of a rotary drill string (not shown). The bit 28 also includes a central passageway 34 extending along the central axis of the bit 28 to allow drilling fluid to enter from the upper section of the drill string (not shown) immediately above and pass downward to the bottom of the well bore to flush cuttings and drilling debris from the well bore.

The journal portion of arm 29 consists of the bearing pin 31 upon which the cutter 30 is mounted. A plurality of bearing systems are located in the bearing area between the cutter 30 and the bearing pin 31. The bearing systems in the bearing area include an outer friction bearing 35, an inner friction bearing 36, a thrust button 37 and a thrust flange 38. A seal 39 is positioned between the cutter 30 and the bearing pin 31. This seal retains lubricant in the bearing area around the bearing systems and prevents any materials in the well bore from entering the bearing area.

Passageways 40, 41, 42, 46 and 47 are provided to allow lubricant to be transmitted to the bearing systems. The passageway 47, as shown, also allows the expander rod 56 to be inserted into position after the cone cutter 30 is placed on the bearing pin 31. The passage 46 extends from the bore 50 to the passageway 47. A lubricant reservoir 51 is located in the bore 50. The lubricant reservoir 51 is located between a flexible diaphragm 49 and a metal canister 52. An O-ring seal 55 prevents borehole fluid from by-passing the upper portion of the canister 52 and lubricant within the lubricant reservoir 51 from escaping into the borehole. The flexible diaphragm 49 prevents lubricant in the lubricant reservoir 51 from escaping into the bore 50 and fluid in the borehole that has entered bore 50 through passage 48 from entering the lubricant reservoir 51. Lubricant within the lubricant reservoir 51 is channeled into the passage 46 through opening 54 and is directed to the bearings. The seal 39 retains the lubricant within the bearing area and prevents borehole fluids from entering the bearing area.

The plugs or rods 43 extend through passages 57 in the bearing pin 31. The plugs or rods 43 are moved into place after the cone cutter 30 is assembled on bearing pin 31. An annular groove 44 is provided in the cutter 30 that is aligned with the passages 57 in the bearing pin 31. The expander and lubricant passage 47 extends from the arm 29 to the passages 57 in the bearing pin 31. The passage 47 allows the expander rod 56 to be inserted to move the individual plugs or rods 43 of the retaining means into the locking position. After the expander rod 56 is in place, the passage 47 is closed by plug 58 which is held in position by weld 59. The expander rod 56 has a portion with a reduced diameter to allow the lubricant to be channeled to the bearings.

The structural elements of a second embodiment of a rotary rock bit constructed in accordance with the present invention having been illustrated, the method of constructing a rock bit according to the present invention will now be considered. Some means must be provided for locking the cone cutter 30 on the bearing pin 31. Traditionally, the locking function has been performed by a ball bearing system. The present invention locks the cone cutter 30 on the bearing pin 31 without the use of the conventional ball bearing system. The plugs or rods 43 are positioned in the passageways 57 in the bearing pin 31. The plugs or rods 43 initially extend into the passageway 47 allowing the cone cutter 30 to be mounted over the bearing pin 31. Once the cone cutter 30 is in place, the expander rod 56 is inserted in passageway 47 until it contacts the plugs or rods 43. Pressure on the expander rod 56 forces the plugs or rods 43 to move radially outward into the groove 44 in the cone cutter 30. This places the ends of the plugs or rods 43 within the groove 44 and locks the rolling cone cutter 30 in place. The closure plug 58 is inserted in the passageway 47 and welded therein by weld 59 and the bit is ready for operation.

The embodiments of an invention in which an exclusive property or privilege is claimed are defined as follows:

1. A method of rotatably locking a rock boring cutter assembly upon a bearing pin, comprising the steps of:
   providing a cantilever bearing pin with radial and axial passages;
   providing a rock boring cutter assembly with an annular inner surface that can be positioned over said bearing pin and an inner annular groove in said annular inner surface;
   providing a retainer assembly, said retainer assembly comprising a multiplicity of locking rods;
   positioning said locking rods in said radial passages in said bearing pin;
   positioning said rock boring cutter assembly on said bearing pin; and
   positioning an expander rod in said axial passage in said bearing pin to contact and cause said locking rods to move radially outward in said radial passages and bridge between said bearing pin and said groove in said rock boring cutter assembly to rotatably lock said rock boring cutter assembly on said bearing pin.

2. A rock boring bit, comprising:
   a cantilevered bearing pin;
   a rock boring cutter rotatably mounted on said bearing pin, said rock boring cutter having an annular inner surface;
   an axial passage in said bearing pin;
   a multiplicity of radial passages in said bearing pin extending radially from said axial passage;
   an annular groove in said annular inner surface of said rock boring cutter; and retainer means for rotatably locking said rock boring cutter on said bearing pin comprising a multiplicity of retainer rods positioned in said radial passages in said bearing pin that projects into said groove in said rock boring cutter and an expander rod positioned in said axial passage in said bearing pin for maintaining said retainer rods in said groove.

3. A rotary rock bit for forming a borehole, comprising:

a rock bit body;

at least one cantilevered bearing pin extending from said rock bit body, said bearing pin having an external bearing surface;

a rolling cone cutter adapted to be mounted over said bearing surface of said bearing pin, said rolling cone cutter having an annular inner bearing surface;

retaining means for rotatably locking said rolling cone cutter on said bearing pin, said retaining means including a multiplicity of radially extending retainer rods and an expander rod that contacts said retainer rods and moves them radially;

an annular groove in the annular inner bearing surface of said rolling cone cutter;

radial retainer rod passages in said bearing pin containing said retainer rods; and an expander rod passage extending axially into said bearing pin that intersects said radial retainer rod passages, said expander rod passage containing said expander rod.

* * * * *